Aug. 10, 1943.  E. H. HART  2,326,217
THERMOMETER BULB MOUNTING
Filed Oct. 1, 1941 2 Sheets-Sheet 2
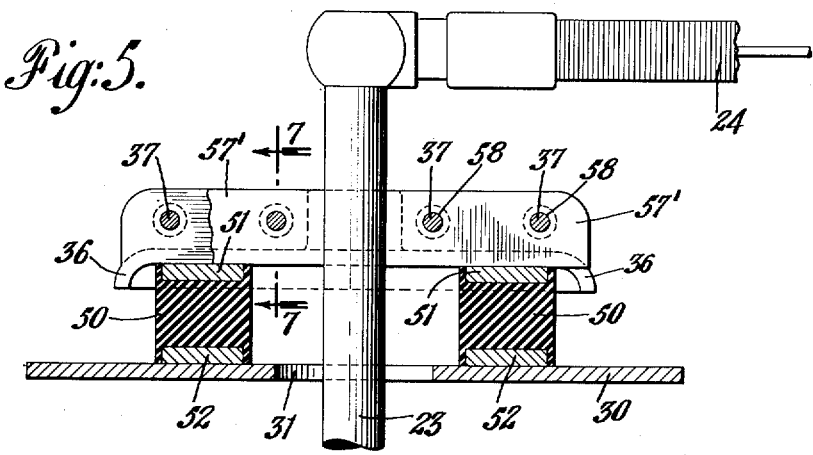
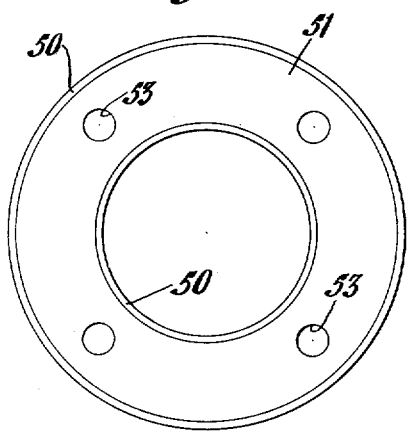
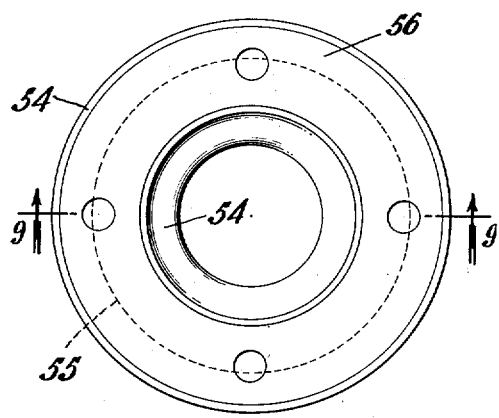
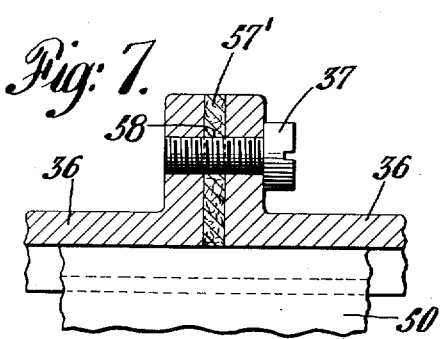
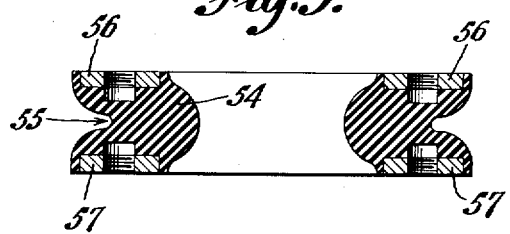
INVENTOR
EUGENE H. HART
BY E.C. Sanborn
ATTORNEY Patented Aug. 10, 1943

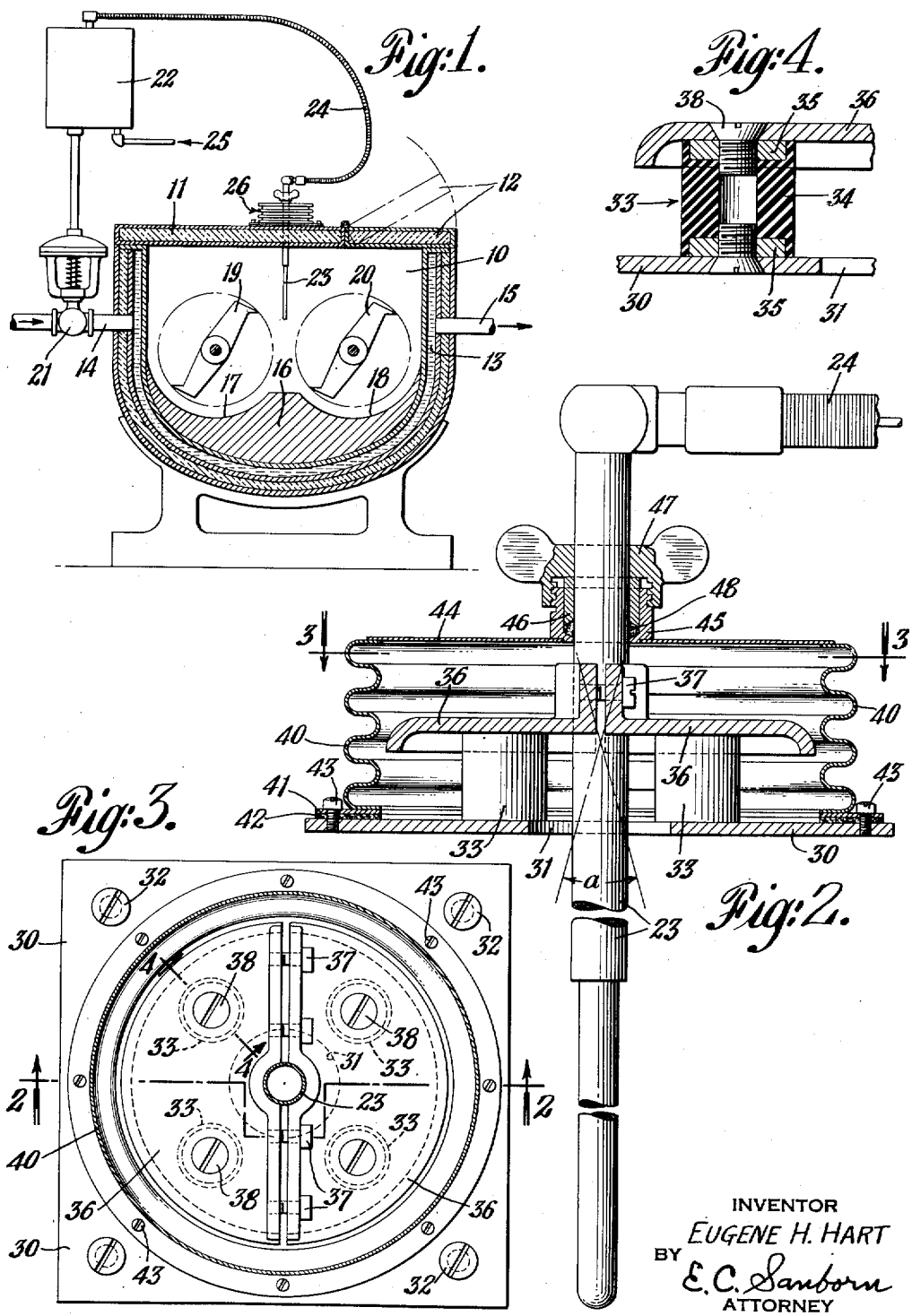

2,326,217

UNITED STATES PATENT OFFICE 2,326,217

THERMOMETER BULB MOUNTING

Eugene H. Hart, Waterbury, Conn., assignor to The Bristol Company, Waterbury, Conn., a corporation of Connecticut Application October 1, 1941, Serial No. 413,095

13 Claims. (Cl. 297—3)

This invention relates to mountings for thermometer bulbs and the like, and more especially to a resilient mounting whereby such a bulb may be yieldingly installed in a processing vessel wherein material being processed is subjected to severe agitation. In certain chemical industries, as, for example, the manufacture of rayon, Cellophane, and similar cellulose derivatives, it is necessary to shred and mix the raw materials under conditions of precisely controlled temperature, requiring that there be an intimate contact between the bulb or sensitive member of a measuring or controlling instrument and the mass of material undergoing treatment. Because of the precision of control usually essential in such processes, it becomes imperative that the bulb be of sufficient extent to present a reasonable average of the temperature of the mass of material being processed and exposed to intimate contact with said material, and that at the same time it be located well away from the walls of the vessel, thus being deprived of such mechanical support as it might derive from said walls, and thus rendered particularly susceptible to distortion or breakage from impact or pressure of the violently agitated mass of material.

It is an object of this invention to provide for so mounting the thermometer bulb that the latter may be resiliently held in intimate association with material being agitated, and in a manner to avoid damage by impact or straining.

It is a further object to provide a mounting of the above nature which may readily be applied to a bulb of conventional design.

It is a further object to provide a mounting of the above nature permitting the bulb to be readily removed and replaced and adjustably located in any desired position.

It is a further object to provide a mounting of the above nature having provision for gas-tight sealing between the space within the processing vessel and the external atmosphere.

More specifically, in the attainment of the objects of the invention it is proposed, in the embodiments hereinafter described, to provide a flange wherein the cylindrical surface or stem of a metallic thermometer bulb may be clamped in any desired position, and to support the flange from a mounting base by means of resilient members of the type commercially known as "vibration dampers." Where sealing is required, the invention provides for enclosing the assembly in a resilient casing, together with provision for effective separation between the atmospheres within and without the vessel to which the device is applied.

In the drawings:

Fig. 1 is an end elevation, partially in section, of a shredder, as used in the manufacture of rayon, showing the application thereto of a bulb mounting embodying the principles of the invention.

Fig. 2 is a vertical longitudinal section, of a bulb mounting embodying the invention, taken on the line 2—2 of Fig. 2.

Fig. 3 shows to a reduced scale a top view of the mounting, in a section taken on the line 3—3 of Fig. 2.

Fig. 4 is an enlarged section of a detail of the device, taken on the line 4—4 of Fig. 3.

Fig. 5 is a vertical section showing a modified type of bulb mounting.

Fig. 6 is a plan view of the mounting ring of Fig. 5.

Fig. 7 is a section on the line 7—7 of Fig. 5.

Fig. 8 is a plan view of a modified form of mounting ring, and

Fig. 9 is a section on the line 9—9 of Fig. 3.

Fig. 1 of the drawings illustrates a shredder of the type used in the preparation of rayon or the like, having associated therewith a controller for regulating the temperature at which the process is carried out, including a temperature-sensitive bulb mounted in accordance with the principles of the invention.

The shredder includes a receptacle 10 having a cover 11, a portion at least of which may be opened, as shown at 12, for admission of material to be processed and for general access to the interior. The outer walls of the receptacle and the cover are made with a suitable heat-insulating structure, and the receptacle is provided with a jacket 13, in which may be circulated a medium entering through a pipe 14 and leaving through a pipe 15 for heating or cooling (as the process may require) the contents of the receptacle. Within the receptacle 10 is provided a massive metal saddle 16 having roughened or toothed surfaces 17 and 18 with which coact revolving blades 19 and 20 in the maceration of material being processed.

Regulation of the temperature of the shredder is effected by automatic control of the flow of the temperature-affecting medium in the jacket 13 through the agency of a regulating valve 21 governed by a controller instrument 22, which may be of any one of a number of well-known forms, but preferably of a pneumatic type such as that fully described and set forth in co-pending application Serial No. 174,609, filed by C. W. Bristol, Nov. 15, 1937, and forming no part of the present invention. A sensitive bulb 23 containing expansible or volatile fluid and operatively connected to the controller 22 through a capillary tube 24 acts in response to changes in the temperature to which it is exposed to vary the fluid pressure upon controlling instrumentalities within the controller 22, whereby the pressure of air or other medium derived from a source 25 and applied to the regulating valve 21 is correspondingly varied, and the flow of temperature-affecting medium regulated to control the temperature of the material being processed.

In accordance with the present invention, the bulb 23 is yieldingly supported by a resilient mounting, this being generally designated by the numeral 26 in Fig. 1, and shown in detail in Figures 2, 3, and 4, to which reference may now be made. The numeral 30 designates a flat base plate, having a centrally located opening 31 of materially greater diameter than the bulb 23, and adapted for permanent mounting on the cover of the shredder, as by screws 32.

Fixed to the surface of the plate 30 symmetrically about the opening 31 are several (in this case, four) resilient elements 33 of the class commercially known as "vibration dampers." Each of the elements 33 consists of a cylindrical structure 34 of rubber or similar resilient material, having integrally attached to the flat ends thereof, as by vulcanizing, metal plates 35 drilled and tapped for engagement by conventional machine screws.

A flange member 36 diametrically divided into two similar portions and centrally bored to a diameter equal to that of the outside surface of the bulb 23 is adapted to be coordinated into a single unit by means of screws 37, whereby said bulb may be securely clamped to said flange member in any desired position relative thereto. The flange member 36 is drilled with holes to correspond (when said member is clamped on the bulb 23) to the relative positioning of the resilient elements 33 on the plate 30, so that the said member may be secured to said elements as by screws 38. It will be seen that when so assembled the bulb 23 and flange 36 will be displaceable as a unit through a solid angle a centering approximately on the axis of the bulb and in the space between the plate 30 and the flange 36, as permitted by longitudinal extension and compression of the resilient elements 33, and without material lateral displacement. Under actual operating conditions, and using commercially available vibration dampers, it has been found that a structure as shown will permit repeated and continued deflections of the supported bulb through an angle of approximately 30 degrees, and that by use of the device, the damage to bulbs has been reduced from a prohibitive to a negligible volume.

For the purpose of providing between the atmospheres internal and external to the shredder a seal which will not interfere with angular motion of the bulb in relation to the cover of the shredder, there may be provided a bellows member 40, having affixed thereto a solid ring 41 drilled for securing to the plate 30 with an interposed gasket 42 by screws 43 threadedly engaging tapped holes in said plate. The end of the bellows member remote from the plate 30 is partially closed by a rigid annular plate 44 secured at its outer edge to the bellows, and centrally carrying a stuffing box 45 adapted to receive a gland 46 bored to fit the bulb 23 and adapted to be forced into place by a clamping screw 47, said elements, together with an included washer 48 of suitable packing material, cooperating to form a fitting similar to that fully set forth and described in U. S. Letters Patent No. 2,188,515 issued to applicant's assignee January 30, 1941.

The normal method of assembly of the resilient mounting, including the sealing device is as follows: The clamping screw 47, the gland 46, the washer 48, and the bellows element are first slipped on the bulb 23, and temporarily secured toward the upper part of the bulb. The plate 30, carrying the resilient members 33 and the divided flange 36, is permanently secured to the cover of the shredder or other vessel with which it is to be used. The bulb 23 is passed through the central opening in the flange and clamped in its proper operating position by tightening the screws 37. The clamping nut 47 is then loosened and the bellows assembly slid along the bulb until the ring 41 engages the plate 30, to which it may be secured by the screws 43, the gasket 42 being interposed between the ring and the plate. The plate 44 is then set to a position which will allow free deflection of the bellows with angular movement of the bulb and assembly completed by tightening the nut 47, thus securing the bellows assembly to the bulb in sealed relationship.

In Figures 5 and 6 is shown an alternative form of the invention in which the functions of support and sealing are both incorporated in a single resilient annular member 50. This member takes the form of a ring of rubber or similar deformable material of axial length corresponding to that of the resilient member 33, shown in the previous embodiment, and of thickness sufficient to provide a suitable degree of yieldable support for the bulb assembly. Set in the flat faces of the ring 50 are annular plates 51 and 52, having therein tapped holes 53 suited to be threadedly engaged by suitable screws through the flange 36 and plate 30 in a manner similar to the resilient members 33 of the previous embodiment.

In Figures 8 and 9 is shown a further alternative embodying an annular member 54 formed of yielding material and having a corrugated conformation, as at 55, to increase its effective resiliency. Set into the flat faces of the member 54 are annular plates 56 and 57, tapped in a manner similar to the plates 51 and 52 of Figures 5 and 6, whereby said resilient annular member may be secured between the flange and the mounting plate of the assembly.

Where either of the forms of the invention as shown in Figures 5, 6, 8, and 9 is utilized, the single integral unit comprising the resilient ring with metallic inserts performs the dual function of supporting and sealing the bulb mounting, thus materially simplifying the construction as compared with that shown in Figures 2, 3, and 4. It is desirable, however, where these last-named forms of the invention are utilized, that there be provided additional sealing in order that there may not be leakage through the parting line between two halves of the flange 36. This may be provided by the use of a pair of gaskets 57', as shown in Figures 5 and 7, each of said gaskets being provided with a pair of holes 58, adapted to receive a pair of the screws 37. The flange member is assembled with one of the gaskets 57' between the flat upstanding portions thereof on each side of the assembly, and the securing screws 37 are then tightened, coordinating the two elements of the flange into an integral unit, thus both clamping the bulb 23 in the desired position, and causing the space between the elements to be sealed gas-tight by the gaskets.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A thermometer bulb mounting comprising a plate, a flange adapted for clamping engagement with said bulb, and resilient supporting means adapted to be secured to both the plate and the flange to permit angular deflection of said bulb with respect to said plate, together with resilient sealing means separate from said resilient supporting means and enclosing said plate, flange, and supporting means.

2. A mounting for supporting an extended thermometer bulb, said mounting comprising a plate adapted to be secured to a vessel, a flange spaced from said plate along the axis of said bulb and having cooperating sections adapted for clamping engagement with said bulb at any desired position along its length, and resilient sealing and supporting means extending axially of said bulb and interposed between said plate and said flange to support the bulb yieldingly in contact with the contents of said vessel and to provide separation between the atmospheres internal and external to the vessel.

3. Apparatus for measuring temperature within a vessel, comprising a member on said vessel having an opening therein, an extended thermometer bulb passing through said opening, said opening being of substantially greater area than the cross-sectional area of the portion of said thermometer bulb passing therethrough, and resilient sealing and supporting means clamped to said bulb at any desired position along its length for enabling substantial angular deflection of said bulb in said opening and providing separation between the atmospheres internal and external to said vessel, said resilient sealing and supporting means extending axially of said bulb.

4. Apparatus for measuring temperature within a vessel, comprising a member on said vessel having an opening therein, a thermometer bulb passing through said opening, said opening being of substantially greater area than the cross-sectional area of the portion of said thermometer passing therethrough, flange means clamped to said bulb, resilient means extending axially of said bulb and mounted at one end on said member, said resilient means supporting said flange means on its opposite end in axially spaced relation to said member for enabling substantial angular deflection of said thermometer bulb in said opening, and other means cooperating with said thermometer bulb and sealing the atmosphere within said vessel from external atmosphere.

5. Apparatus for measuring temperature within a vessel, comprising a member on said vessel having an opening therein, an extended thermometer bulb passing through said openng, said opening being of substantially greater area than the cross-sectional area of the portion of said bulb passing therethrough, flange means clamped to said thermometer bulb and spaced from said member along the axis of said bulb, and means extending axially of said bulb and interposed between said flange means and said member and resiliently supporting said bulb at any desired position along its length to enable substantial angular deflection thereof in said opening and for sealing the atmosphere within said vessel from external atmosphere.

6. In combination, a processing vessel adapted to contain a mass of material in a state of agitation, an elongated thermometer element for determining the temperature of said material, resilient supporting means mounted at one end upon said vessel and extending axially of said thermometer element, a clamping member carried by the opposite end of said resilient means and adapted to support said thermometer element in any desired position with respect to its length, whereby the temperature of said material may be determined at a predetermined depth and the thermometer element may be free for motion in response to the agitation of the mass.

7. In combination, a processing vessel adapted to contain a mass of material in a state of agitation, an elongated thermometer element for determining the temperature of said material, resilient supporting means mounted at one end upon said vessel and extending axially of said thermometer element, a clamping member carried by the opposite end of said resilient means and adapted to support said thermometer element in any desired position with respect to its length, whereby the temperature of said material may be determined at a predetermined depth and the thermometer element may be free for motion in response to the agitation of the mass, and other resilient means cooperating with said thermometer element and said vessel for sealing the atmosphere within said vessel from external atmosphere.

8. A mounting for an extended thermometer bulb said mounting comprising a plate adapted to be secured to a vessel and having an opening for the passage of said bulb therethrough, a plurality of resilient elements each mounted at one end on said plate and disposed at points in a zone surrounding said opening, said resilient elements extending axially of said bulb, a flange supported on said resilient elements at their opposite ends and comprising cooperating sections defining an opening for said bulb above the opening in said plate and adapted for clamping engagement with said bulb to clamp the same in any of a plurality of selected positions within said vessel, said openings in said flange and said plate being so disposed with respect to said resilient elements as to enable said bulb to extend downwardly through said openings out of contact with said resilient elements, and said opening in said plate being of substantially greater area than the opening in said flange.

9. In combination, a processing vessel having means therein for agitating a mass of material, an elongated thermometer element for determining the temperature of said material, means on said vessel having an opening for the passage of said thermometer element into said vessel, resilient means extending axially of said thermometer element and disposed at points in a zone surrounding said opening, said resilient means being mounted at one end on the first mentioned means, clamping means mounted on the opposite end of said resilient means and adapted to support said thermometer element out of contact with said resilient means and in any desired position with respect to its length to hold said element in any of a plurality of selected positions in the material agitated by said agitating means, said opening being of an area substantially greater than the cross-sectional area of said element.

10. A mounting for supporting an extended thermometer bulb, said mounting comprising a member having an opening therein for the passage of said bulb, a flange adapted for clamping engagement with said bulb in any desired position with respect to the extended length of the same, and resilient means extending axially of said bulb and mounted at one end on said member, said resilient means supporting said flange upon its opposite end in axially spaced relation to said member to permit angular deflection of said bulb in said opening.

11. A mounting for supporting an extended thermometer bulb, said mounting comprising a member having an opening therein for the passage of said bulb, a flange adapted for clamping engagement with said bulb in any desired position with respect to the extended length of the same, and means comprising a plurality of resilient elements disposed about said opening and extending axially of said bulb, each of said resilient elements being mounted at one end on said member and supporting said flange upon its opposite end in axially spaced relation to said member to permit angular deflection of said bulb in said opening.

12. A mounting for supporting an extended thermometer bulb, said mounting comprising a member having an opening therein for the passage of said bulb, a flange adapted for clamping engagement with said bulb in any desired position with respect to the extended length of the same, and means comprising an annular resilient element surrounding said opening and extending axially of said bulb, said element being mounted at one end on said member and supporting said flange upon its opposite end in axially spaced relation to said member to permit angular deflection of said bulb in said opening.

13. Temperature measuring means comprising a member having an opening therein, an extended thermometer bulb passing through said opening, said opening being of substantially greater area than the cross-sectional area of the portion of the bulb passing therethrough, flange means having clamping engagement with said thermometer bulb at any desired portion of said length, and resilient means extending axially of said bulb and mounted at one end on said member, said resilient means supporting said flange upon its opposite end in axially spaced relation to said member for enabling substantial angular deflection of said bulb in said opening.

EUGENE H. HART.